(12) United States Patent
Hayashizaki et al.

(10) Patent No.: US 8,549,498 B2
(45) Date of Patent: Oct. 1, 2013

(54) INTEGRATION OF TRACE SELECTION AND TRACE PROFILING IN DYNAMIC OPTIMIZERS

(75) Inventors: Hiroshige Hayashizaki, Kanagawa-ken (JP); Hiroshi Inoue, Kanagawa-ken (JP); Peng Wu, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/215,747

(22) Filed: Aug. 23, 2011

(65) Prior Publication Data

US 2013/0055226 A1 Feb. 28, 2013

(51) Int. Cl.
*G06F 9/45* (2006.01)

(52) U.S. Cl.
USPC .......................................... 717/148

(58) Field of Classification Search
USPC .......................................... 717/148
See application file for complete search history.

(56) References Cited

U.S. PATENT DOCUMENTS

| | | | |
|---|---|---|---|
| 6,170,083 B1 * | 1/2001 | Adl-Tabatabai | 717/158 |
| 7,496,908 B2 | 2/2009 | DeWitt, Jr. et al. | |
| 7,694,281 B2 | 4/2010 | Wang et al. | |
| 7,725,885 B1 | 5/2010 | Pradhan et al. | |
| 2002/0104075 A1 * | 8/2002 | Bala et al. | 717/136 |
| 2002/0112227 A1 * | 8/2002 | Kramskoy et al. | 717/148 |
| 2011/0088016 A1 * | 4/2011 | Ball et al. | 717/128 |

OTHER PUBLICATIONS

Duesterwald, Evelyn et al.; "Software Profiling for Hot Path Prediction: Less is More"; International Conference on Architectural Support for Programming Languages and Operating Systems (ASPLOS); Nov. 12-15, 2000.*
Gal, Andreas; "Incremental Dynamic Code Generation with Trace Trees"; University of California, Irvine, Information and Computer Sciences website; Dec. 23, 2006.*
Bala, V., et al., "Transparent dynamic optimization: The design and implementation of Dynamo.", Tech. Rep. Technical Report HPL-1999-78, HP Laboratories, Jun. 1999.
Bala, V., et al., "Dynamo: A Transparent Runtime Optimization System", Conference on Programming Language Design and Implementation (PLDI), Jun. 2000, pp. 1-12.
Bebenita, M., et al., "SPUR: a trace-based JIT compiler for CIL", OOPSLA/SPLASH, ACM, Oct. 2010, pp. 708-725.
Bolz, C., et al., "Tracing the Meta-Level: PyPy's Tracing JIT Compiler", Optimization of Object-Oriented Languages and Programming Systems, Jul. 2009, pp. 18-25.

(Continued)

*Primary Examiner* — Wei Zhen
*Assistant Examiner* — Clint Thatcher
(74) *Attorney, Agent, or Firm* — Scully, Scott, Murphy & Presser, P.C.; Preston J. Young, Esq.

(57) ABSTRACT

Integrated trace selection and profiling in dynamic optimizers may include selecting a trace head based on profile of basic blocks that are executed. The basic blocks executed from the trace head may be recorded as a trace. The trace may be added to a trace nursery in non-compiled state. The trace may be interpreted and profiled until the trace matures. Under a profiling mode, path sensitive runtime information such as values, types, targets of call-sites, and exit frequencies can be collected. The trace may be moved out of the nursery to a compilation queue in response to determining that the trace has matured based on an execution count of the profiled trace.

25 Claims, 3 Drawing Sheets

(56) References Cited

OTHER PUBLICATIONS

Bruening, D., et al., "Maintaining Consistency and Bounding Capacity of Software Code Caches", In International Symposium on Code Generation and Optimization (CGO), Mar. 2005.

Bruening, D., et al., "An Infrastructure for Adaptive Dynamic Compilation", In International Symposium on Code Generation and Optimization (CGO), Mar. 2003, pp. 265-275.

Blackburn, S. M., et al., "The DaCapo Benchmarks: Java Benchmarking Development and Analysis", OOPSLA, Oct. 2006, pp. 169-191.

Gal, A., et al., "Trace-based just-in-time type specialization for dynamic languages", PLDI, Jun. 2009, pp. 465-478.

Gal, A., et al., "Incremental dynamic code generation with trace trees". Tech. rep., University of California Irvine, Nov. 2006, pp. 1-11.

Gal, A., et al., "HotPathVM: An Effective JIT Compiler for Resource-constrained Devices", International Conference on Virtual Execution Environments, Jun. 2006, pp. 144-153.

Grcevski, N., et al., "Java just-in-time compiler and virtual machine improvements for server and middleware applications", In International Conference on Virtual Execution Environments, Jun. 2004.

Hayashizaki, H., et al., "Improving the performance of tracebased systems by false loop filtering", Proceedings of the sixteenth international conference on Architectural support for programming languages and operating systems, Mar. 2011, pp. 405-418.

Hiniker, D., et al., "Improving region selection in dynamic optimization systems", in 38th International Symposium on Microarchitecture, Dec. 2005.

Inoue, H., "A Trace-based Java JIT Compiler Retrofitted from a Method-based Compiler", Proceedings of the International Symposium on Code Generation and Optimization, Apr. 2011.

Merrill, D., et al., "Trace fragment selection within method-based JVMs." International Conference on Virtual Execution Environments, Jun. 2008, pp. 41-50.

Whaley, J. "Partial Method Compilation using Dynamic Profile Information", Proceeding of ACM SIGPLAN Conference on Object-Oriented Programming Systems, OOPSLA, Oct. 2001, pp. 166-179.

Zaleski, M., et al., "YETI: a graduallY Extensible Trace Interpreter" in VEE'07: Proceedings of the 3rd ACM/USENIX international conference on Virtual execution environments, Jun. 2007, pp. 83-93.

Zhao, C., et al., "Lengthening Traces to Improve Opportunities for Dynamic optimization", 12th Workshop on Interaction between Compilers and Computer Architectures, Feb. 2008.

Wu, P., et al., "Reducing Trace Selection Footprint for Large-scale Java Applications without Performance Loss", OOPSLA, Mar. 2011.

Bolz, C., et al., "Allocation Removal by Partial Evaluation in a Tracing JIT", PEPM'11, Jan. 2011, pp. 43-52.

Guo, S., "The Essence of Compiling with Traces", POPL'11, Jan. 2011, pp. 563-574.

Merrill et al., Trace Fragment Selection within Method-based JVMs, VEE'08—Proceedings of the 4th International Conference on Virtual Execution Environments, p. 41-50, 2008, VEE'08—Proceedings of the 4th International Conference on Virtual Execution Environments.

Hiniker Improving Region Selection in Dynamic Optimization Systems.

* cited by examiner

INTEGRATION OF TRACE SELECTION AND TRACE PROFILING IN DYNAMIC OPTIMIZERS

FIELD

The present application relates generally to computers, computer systems, computer program compilations and optimizations, and more particularly to trace selection and trace profiling.

BACKGROUND

In a trace compiler, a trace is a single-entry multiple-exit region formed out of instructions following a real execution path. Trace-based code optimizers compile traces, which are sequences of executed instructions formed at runtime. Such code optimization was initially proposed for binary optimizers where static program information is not available. Examples of trace-based optimization systems include binary translators such as DynamoRIO™, and trace-based just-in-time (JIT) compiler such as TraceMonkey™ the Javascript JIT from Firefox™.

Trace selection refers to a process that forms traces out of executed instructions at runtime. The current dominant approach in trace-driven optimizers utilizes two-step next-executing-tail (NET) type of selection. The two-step NET type of selection profiles frequently executed basic blocks (BB) as the trace head; once the trace head is selected, instructions executed next are recorded the trace. In NET selection, traces are initially built from targets of backward branches and grow gradually out of side-branches (side-exits) of existing traces. Trace size is determined by the termination conditions used in trace recording. Once a trace head is selected, trace formation is determined by the very path taken at trace recording time.

Another approach is a path profiling approach in which the frequently executed paths are profiled as traces. Compared to the NET approach, this approach may be more accurate in capturing of hot paths, but may require high overhead. Due to the high profiling overhead, the path profiling approach often requires special hardware support, thus are rarely used in real trace compilers.

The ability to incorporate runtime (profiling) information into the compilation scope is one advantage of compiling traces over compiling statically defined program scopes such as methods or loops. However, there is limitation in how profiling information is used in NET style trace selection. Except for trace head selection, profiling information is not used in the formation of the trace. For example, the trace recording step uses no history data. As a result, it may introduce pathologic formations or very different formations across multiple runs of a program. Once a trace is formed and compiled, profiling the execution of a trace often requires the trace compiler instrument binary traces, and utilizing the profiling information for better code generation requires recompilation of the trace.

BRIEF SUMMARY

A method for integrated trace selection and profiling in dynamic optimizers, in one aspect, may include selecting a trace head based on profile of basic blocks that are executed. The method may also include recording the next executed basic block as tail to the trace head forming a trace and adding the trace in a nursery in non-compiled state. The method may further include interpreting the trace in the nursery and profiling it until the trace matures, and transferring the trace out of the nursery to a compilation queue in response to determining that the trace has matured based on an execution count of the profiled trace.

A system for integrated trace selection and profiling in dynamic optimizers, in one aspect, may include a processor and memory. The memory may include a nursery and a compilation queue. A module may be operable to execute a program code on the processor, and further operable to select a trace head based on profile of basic blocks that are executed. The module may be further operable to record the next executed basic block as tail to the trace head forming a trace and add the trace in the nursery in non-compiled state. The module may be further operable to interpret the trace in the nursery and profile the trace until the trace matures. The module may be further operable to transfer the trace out of the nursery to the compilation queue in response to determining that the trace has matured based on an execution count of the profiled trace.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A technique referred to as trace path profiling is presented in one embodiment of the present disclosure. In one embodiment, trace path profiling profiles the program states along the execution of a trace. The program states include any profilable runtime information that may include but not limited to, variable types and values, direction of branches, targets of call-sites, entry frequencies to traces, exit frequencies along side-exits of traces. In one embodiment, trace path profiling of the present disclosure may work as follows.

1. A newly formed trace is not immediately submitted to compilation, instead it is kept in a "nursery" and interpreted for a short time.

2. When the trace is being interpreted, the interpreter records the entry and exit frequency for each basic block on the trace, but do not update counters associated with any basic block on the trace and do not dispatch to other traces. Other runtime properties can be profiled when the interpreter interprets the trace.

3. A nursery trace is compiled only if its entry frequency exceeds a predefined threshold, at which point, the profiling mode ends. Traces that never leave the "nursery" are considered as dead traces and will not be compiled.

4. Trace entry and exit frequencies and other runtime properties collected during trace path profiling can be used in improving formation of the trace or generated codes for the trace.

While most existing profiling techniques apply to individual basic blocks (i.e., a sequence of instructions with a single entry point and a single exit point) or methods, trace path profiling of the present disclosure is path sensitive. That is, the program state being profiled at a trace is sensitive to the execution (trace) path taken to reach the profiled program point. For instance, the target of a method invocation may depend on the calling context of the invocation. Therefore, a benefit of trace path profiling is that it produces more accurate profiling information due to path sensitivity. Since path sensitive profiling information is more accurate than ones without path sensitivity, they can be used in any profile-based optimizations, such as specialization based on profiled values, virtual guard elimination, program hotness based optimizations. In addition, trace path profiling can be used to improve trace formation itself.

An example of path sensitive information may be illustrated in the following example which uses the target of a virtual method invocation as an example.

Given a virtual function x.foo( ), suppose at the callsite, it may either invoke Class1::foo( ) or Class2::foo( ). A path insensitive profiling will return two possible calling targets for x.foo( ).

Now, suppose there are two calling contexts for x.foo( )
1: A( )→B( )→x.foo( )
2: C( )→D( )→x.foo( )
And when along path 1, x.foo( ) always calls class1::foo( ) where along path 2, x.foo( ) always calls class2::foo( ). Then path sensitive profiling is able to return a single call target for each of the two calling contexts for x.foo( ).

Figure 2:
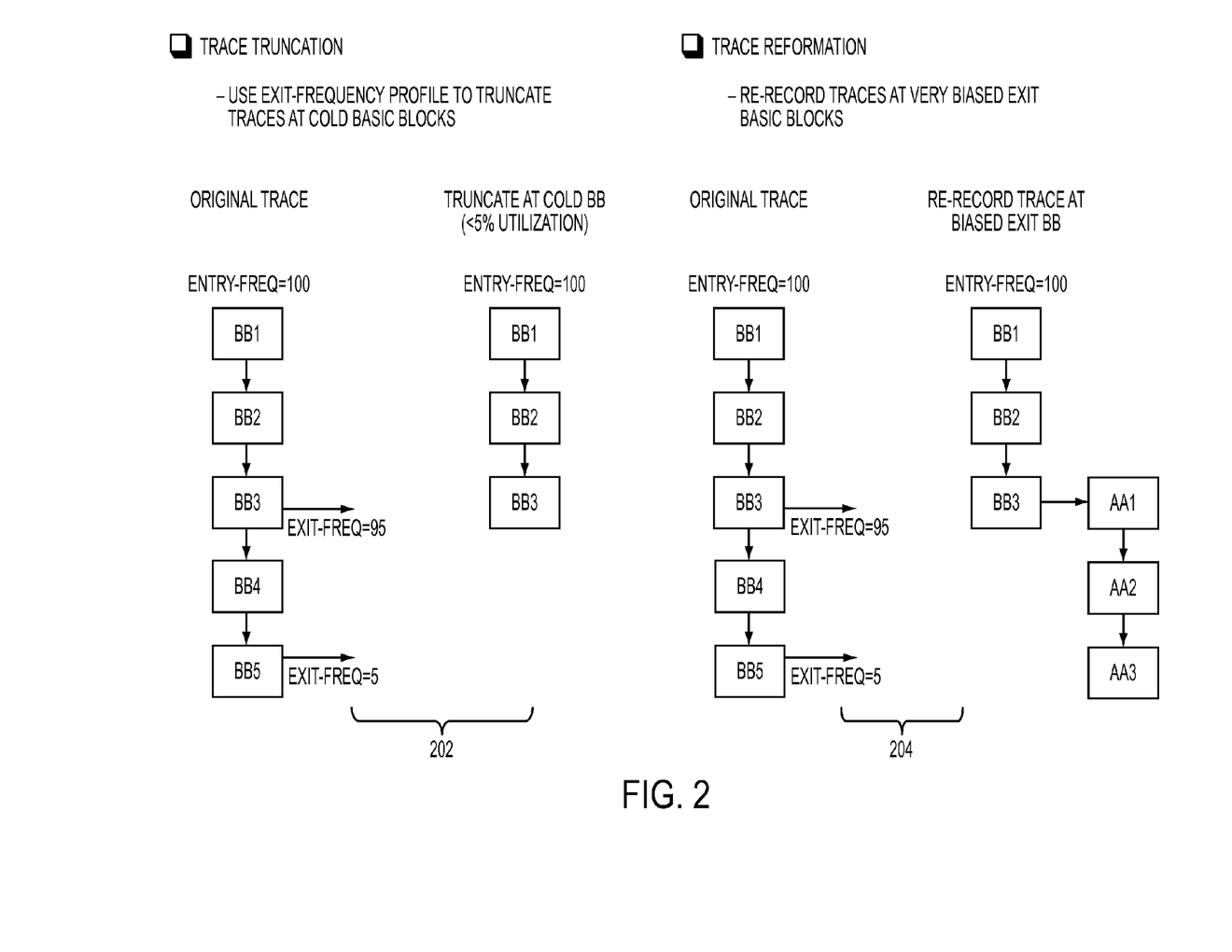
FIG. 2 illustrates usage scenario of using profiling information obtained by trace path profiling in one embodiment of the present disclosure.

FIG. 2 provides two examples of using trace path profiling information to improve the formation of traces.

The first example 202 illustrates profile-based trace truncation. Profile-based truncation uses the profiling information collected by trace path profiling to truncate traces at hot side-exits of a trace. For a given trace, trace path profiling collects the entry frequency of a trace as well as exit-frequency of each basic block on the trace, i.e., the number of times execution leaves a trace via this basic block. From exit frequencies, one can compute the execution frequency of each basic block on the trace. Profile-based trace truncation uses a heuristic: for a given basic block x on a trace, if the entry frequency of x on the trace is smaller than a predefined fraction of the entry frequency of the trace, we truncate the trace at x.

The second example 204 illustrates profile-based trace reformation Similar to profile-based trace truncation, this technique identifies hot exits of a trace and then records the trace again at the side-exit when the execution takes the off-the-trace direction.

Another benefit of trace path profiling is that it can be used to reduce the formation of short-lived traces. Short-lived trace formation refers to a pathology in trace selection that forms traces that execute only for a very short time. This happens when the head of a trace is subsumed by a later formed trace, making it impossible to enter the early trace from the head.

Trace path profiling reduces the negative impact of short-lived traces by identifying them at profiling time and avoiding the compilation of short-lived traces. Trace path profiling can identify short-lived traces because it mimics the execution of a compiled trace, therefore short-lived traces that manifest in a binary trace execution also manifests in trace path profiling.

An example algorithm for trace path profiling is shown as lines 10-19 and 28-37 in Algorithm 1, which may be invoked for every control-flow event executed by the interpreter. In Algorithm 1, ShouldEndTrace(e) decides when to end a trace recording; getStartPC(T, i) gets the bytecode program counter (PC) at the beginning of the i-th basic block on trace T; incExitFreq(T, i) increments the exit frequency associated with the i-th basic block on trace T; isHotExit(T, i) determines whether the i-th BB is a hot exit on trace T; getTrace(i) returns the trace associated with bytecode PC i (if any); isCompiled (T) checks if trace T is compiled; getAddCounter(i) retrieves the counter associated with bytecode PC, i, or if not available, allocates a new counter for i.

---

Algorithm 1 TraceSelectionWithSizeControl(e)
Input: Let e be a control-flow or an exact-bb event, PC be target PC of e,
Ph and Th be the pro-filing and trace-head thresholds respectively, and buf
be the recording buffer.
 1: /* trace recording */
 2: if mode = record then
 3:     if ShouldEndTrace(e) then
 4:         create trace from buf, mode ←default
 5:     else
 6:         append(buf,e)
 7:     end if
 8:     return
 9: end if
10: /* trace path profiling */
11: if curr tr != null then
12:     if PC = getStartPC(curr tr, curr pos) then
13:         curr pos + +
14:         return
15:     else
16:         incExitFreq(curr tr, curr pos)
17:         if isHotExit(curr__tr, curr__pos) then
18:             apply trace truncation or reformation
19:         endif
20:         curr__tr ← null
21:     end if
22: end if
23: /* trace head selection and dispatch */
24: if isBackwardBranch(e) or isTraceExit(e) then
25:     if (tr ← getTrace(PC)) != null then
26:         if isCompiled(tr) then
27:             dispatch to binary address of tr
38:         else
29:             /* enter trace path profiling mode */
30:             tr.entryFreq++
31:             if tr.entryFreq > $P_h$ then
32:                 apply profiled based trace reformation on tr
33:                 submit tr to compilation queue
34:             end if
35:             curr pos + +, curr tr ← tr
36:         end if
37:         return
38:     end if
39:     ctr ← getAddCounter(PC)
40:     if (+ + ctr) > $T_h$ then
41:         mode ← record, buf ←⇔ , append(buf, e)
42:     end if
43: end if
44: return

---

In one embodiment of the present disclosure, a trace selection and trace compilation may be performed. The trace selection may include a trace head selection in which basic blocks (BBs) are profiled to select trace heads; trace recording in which the next-executing-tail is recorded as trace and placed in a nursery but not compiled; trace profiling in which the nursery trace is interpreted and profiled until it matures, the matured trace being compiled and moved out of the nursery; and trace reformation in which profiling information is used to reform and regroup traces. The trace compilation may include using trace profiling information for code generation and optimization.

The methodology of the present disclosure in one embodiment enables early one-pass profiling at trace selection phase without requiring separate profiling phase that involves binary instrumentation and recompilation. Using early profiling information may improve trace formation and trace code generation.

Figure 1:
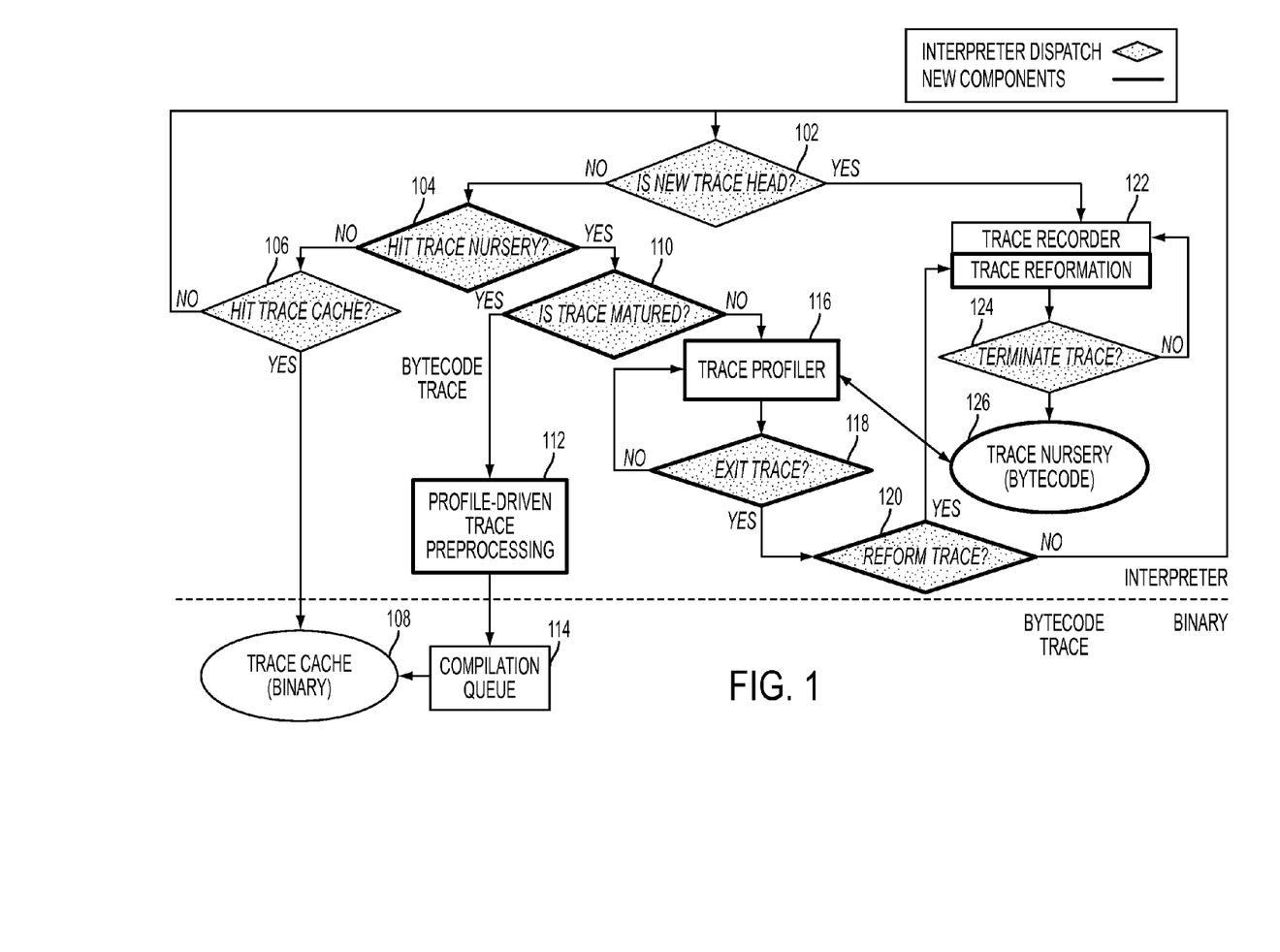
FIG. 1 is flow diagram that illustrates a methodology of the present disclosure in one embodiment.

FIG. 1 is flow diagram that illustrates a methodology of the present disclosure in one embodiment. At 102, it is determined as to whether a new trace head has been selected. For instance, a basic block (BB) may be selected as the trace head if the frequency of the basic block invoked exceeds a predetermined threshold that specifies the minimal frequency for a BB to be selected as a trace head, e.g., referred to as trace head threshold (as $T_h$ used in Algorithm 1). If the new trace head has been selected, at 122 the BBs subsequently executed are immediately recorded as the trace until termination condition is met at 124. At 126, the recorded trace is registered in a "nursery" trace cache. The traces in the nursery are not compiled, but interpreted. There traces are under path profiling mode.

Interpreter can dispatch to traces in the "nursery" and interpret bytecodes on the trace. This is called the trace path profiling mode (as lines 10~19 in Algorithm 1). Under the trace path profiling mode, the trace runtime maintains a counter (e.g., as tr.entryFreq in Algorithm 1) for each trace to record the number of entries to the trace (as line 30 in Algorithm 1) as well as a counter for each BB where an exit has been taken on the trace to record the number of exits from the BB (as incExitFreq(curr_tr,curr_pos) in Algorithm 1). It is also possible to record other profiling information during trace path profiling (specific examples not shown in Algorithm 1).

At 104, it is determined whether the next bytecode to be executed is the head of a nursery trace. At 110, it is determined whether a nursery trace is matured. Whether the trace is matured may be determined based on whether the frequency of entries to the trace exceeds a predetermined threshold (e.g., $P_h$ in Algorithm 1). If the trace has not matured, trace profiling is performed at 116 (as for example in lines 10~21 in Algorithm 1). Basically, the interpreter remembers the current trace being profiled (curr_tr in Algorithm 1) and the last BB executed on the trace (curr_pos in Algorithm 1). If the next BB to be executed does not follow the execution path of the trace, a trace exit is recorded. During the trace path profiling, when an exit is taken on a nursery trace at 118, the trace runtime may decide to reform a trace at the current trace exit point (as line 18 in Algorithm 1) at 120 and 122, such as entering the recording mode to record the execution path following the trace exit and use the recorded segment to replace the previously recorded segment of the trace following the hot trace exit.

At 112, if the trace is matured, profile-driven trace preprocessing is performed such as truncating traces at hot trace exits based on profiled exit information.

At 114, a nursery trace is submitted to compilation queue if the entry frequency to the trace exceeds a predefined threshold (as line 31~33 in Algorithm 1). The compiler may use the profiling information in code generation and optimizations. Once a trace is compiled, it is moved out of the nursery and into the real trace cache at 108. The trace is then out of profiling mode.

At 106 if the next bytecode to be executed is not the head of a nursery trace, it is determined whether it is the head of a compiled trace. If so, the interpreter directly transfers the execution to the binary address of the compiled trace.

Trace path profiling (profile) technique of the present disclosure in one embodiment prevents short-lived traces from being compiled. It works, for example, by profiling the execution of a nursery trace where compilation is triggered only after the entry frequency of the trace exceeds a threshold. Those that do not meet the threshold are short-lived by definition. Briefly, short-lived trace formation refers to a phenomenon where some traces are formed but seldom executed. The methodology of the present disclosure may control size of the trace and reduce the footprint of trace selection without incurring any performance loss. The technique disclosed in the present disclosure may cut the code size and compilation time and reduce start-up time while retaining the steady-state performance.

Figure 3:
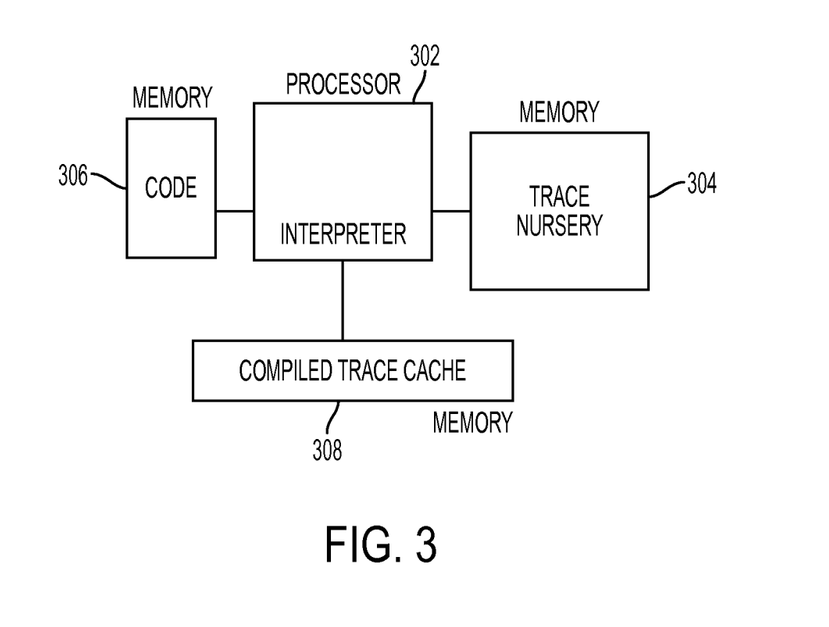
FIG. 3 is a block diagram illustrating functional components for trace path profiling of the present disclosure in one embodiment.

FIG. 3 is a block diagram illustrating functional components for trace path profiling of the present disclosure in one embodiment. A module such as an interpreter 302 may execute a program code 306 on a processor. The module 302 may select or detect whether a new trace head has been selected, and if so record the basic blocks that are executed subsequently until a termination condition is met as the trace, saving the recorded trace in trace nursery 304 in memory. The basic blocks in the trace nursery 304 are saved in un-compiled state. The recorded trace is profiled, for instance, information about the trace and the basic blocks that form the trace may be determined and saved. The trace saved in the trace nursery 304 may be compiled and saved into the compiled trace cache 308 in memory, if the trace in the trace nursery 304 matures. The trace is designated as mature if it meets a predetermined condition, e.g., the frequency of entries into the trace exceeds a predetermined threshold.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for integrated trace selection and profiling in dynamic optimizers, comprising:
    selecting a trace head based on profile of basic blocks that are executed, wherein a basic block is selected as the trace head if a frequency of the basic block invoked exceeds a predetermined threshold that specifies a minimal frequency for the basic block to be selected as a trace head;
    recording next executed basic block as tail to the trace head forming a trace and adding the trace in a nursery in non-compiled state; and
    interpreting the trace in the nursery and profiling it until the trace matures, the profiling comprising maintaining a frequency of entries to the trace in the nursery and a count for each basic block where an exit has been taken on the trace, and wherein one or more counters associated with one or more basic blocks on the trace are not updated during the interpreting of the trace in the nursery; and
    transferring the trace out of the nursery to a compilation queue in response to determining that the trace has matured based on the frequency of entries of the profiled trace.

2. The method of claim 1, further including performing trace truncation based on information collected from the profiling.

3. The method of claim 2, wherein the trace truncation includes, for a given basic block x on the trace, if an entry frequency of x on the trace is smaller than a predefined fraction of an entry frequency of the trace, truncating the trace at x.

4. The method of claim 1, further including reforming the trace based on information collected from the profiling.

5. The method of claim 4, wherein the reforming the trace includes identifying hot exits of a trace and recording the trace again at the hot exits.

6. The method of claim 1, further including regrouping the trace based on information collected from the profiling.

7. The method of claim 1, wherein the profiling collects path-sensitive profiling information.

8. The method of claim 7, wherein the path-sensitive profiling information includes one or more of values and types of variables, targets of virtual function calls, or execution frequency of basic blocks, or combinations thereof.

9. The method of claim 1, further including reducing short-lived traces based on information collected from the profiling.

10. The method of claim 1, wherein the trace matures if the frequency of entries to the trace exceeds a predetermined profiling threshold.

11. A non-transitory computer readable storage medium storing a program of instructions executable by a machine to perform a method of integrated trace selection and profiling in dynamic optimizers, comprising:
    selecting a trace head based on profile of basic blocks that are executed, wherein a basic block is selected as the trace head if a frequency of the basic block invoked exceeds a predetermined threshold that specifies a minimal frequency for the basic block to be selected as a trace head;
    recording next executed basic block as tail to the trace head forming a trace and adding the trace in a nursery in non-compiled state; and
    interpreting the trace in the nursery and profiling it until the trace matures, the profiling comprising maintaining a frequency of entries to the trace in the nursery and a count for each basic block where an exit has been taken on the trace, and wherein one or more counters associated with one or more basic blocks on the trace are not updated during the interpreting of the trace in the nursery; and
    transferring the trace out of the nursery to a compilation queue in response to determining that the trace has matured based on the frequency of entries of the profiled trace.

12. The computer readable storage medium of claim 11, further including performing trace truncation based on information collected from the profiling.

13. The computer readable storage medium of claim 12, wherein the trace truncation includes, for a given basic block x on the trace, if an entry frequency of x on the trace is smaller than a predefined fraction of an entry frequency of the trace, truncating the trace at x.

14. The computer readable storage medium of claim 11, further including reforming the trace based information collected from the profiling.

15. The computer readable storage medium of claim 14, wherein the reforming the trace includes identifying hot exits of a trace and recording the trace again at the hot exits.

16. The computer readable storage medium of claim 11, further including regrouping the trace based on information collected from the profiling.

17. The computer readable storage medium of claim 11, wherein the profiling collects path-sensitive profiling information.

18. The computer readable storage medium of claim 17, wherein the path-sensitive profiling information includes one or more of values and types of variables, targets of virtual function calls, or execution frequency of basic blocks, or combinations thereof.

19. The computer readable storage medium of claim 11, further including reducing short-lived traces based on information collected from the profiling.

20. The computer readable storage medium of claim 11, wherein the trace matures if the frequency of entries to the trace exceeds a predetermined profiling threshold.

21. A system for integrated trace selection and profiling in dynamic optimizers, comprising:
 a processor;
 a memory comprising a nursery and a compilation queue;
 a module operable to execute a program code on the processor, the module further operable to select a trace head based on profile of basic blocks that are executed wherein a basic block is selected as the trace head if a frequency of the basic block invoked exceeds a predetermined threshold that specifies a minimal frequency for the basic block to be selected as a trace head, the module further operable to record next executed basic block as tail to the trace head forming a trace and adding the trace in the nursery in non-compiled state, the module further operable to interpret the trace in the nursery, and profile the trace until the trace matures by at least maintaining a frequency of entries to the trace in the nursery and a count for each basic block where an exit has been taken on the trace, and wherein one or more counters associated with one or more basic blocks on the trace are not updated during the interpreting of the trace in the nursery, the module further operable to transfer the trace out of the nursery to the compilation queue in response to determining that the trace has matured based on the frequency of entries of the profiled trace.

22. The system of claim 21, wherein trace truncation is performed based on information collected from the profiling.

23. The system of claim 22, wherein the trace truncation includes, for a given basic block x on the trace, if an entry frequency of x on the trace is smaller than a predefined fraction of an entry frequency of the trace, truncating the trace at x.

24. The system of claim 21, further including reforming the trace based information collected from the profiling.

25. The system of claim 24, wherein the reforming the trace includes identifying hot exits of a trace and recording the trace again at the hot exits.

* * * * *